Patented Apr. 23, 1940

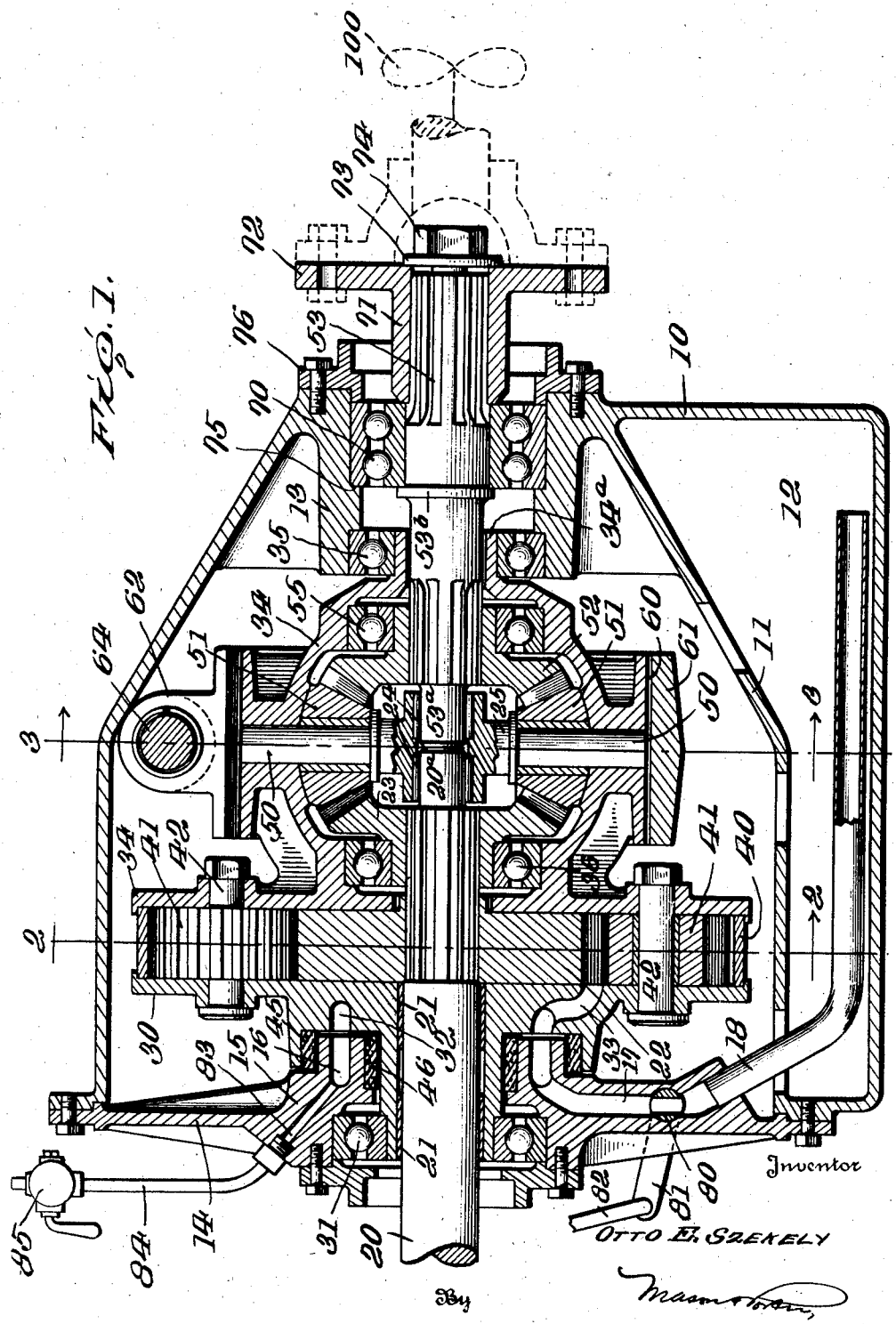

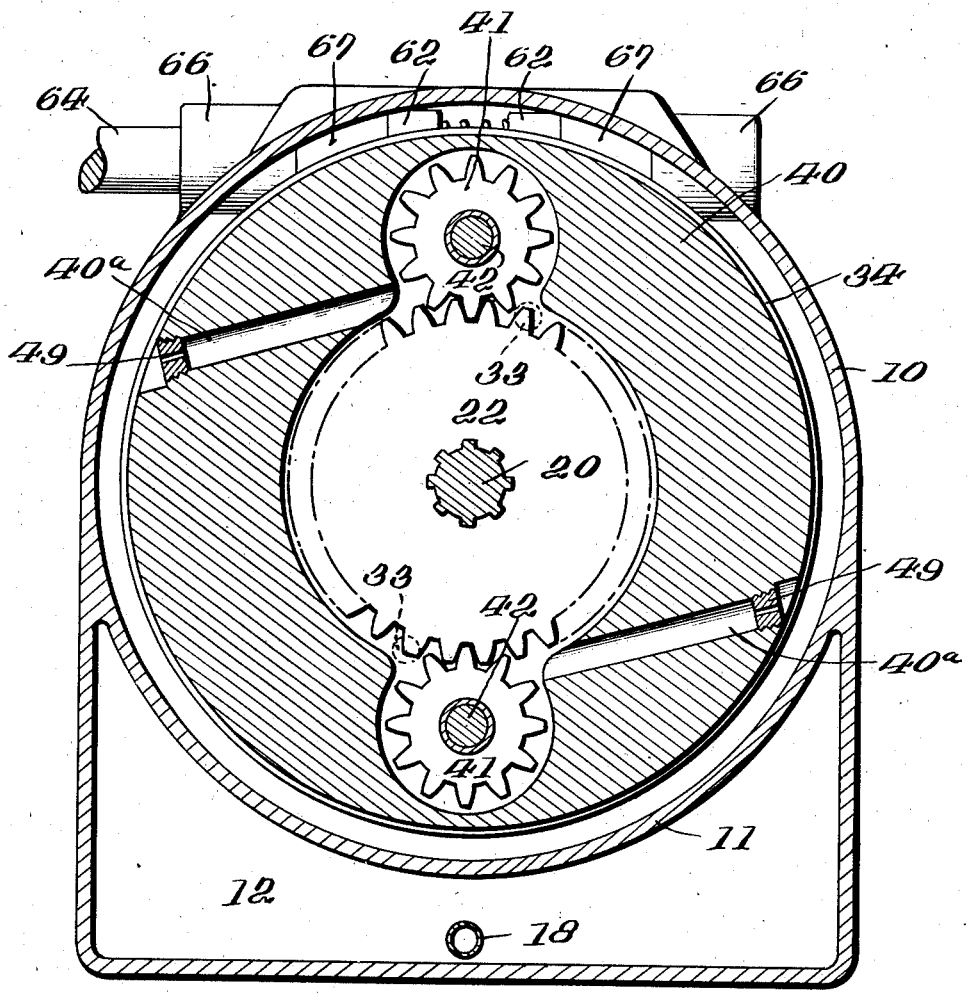

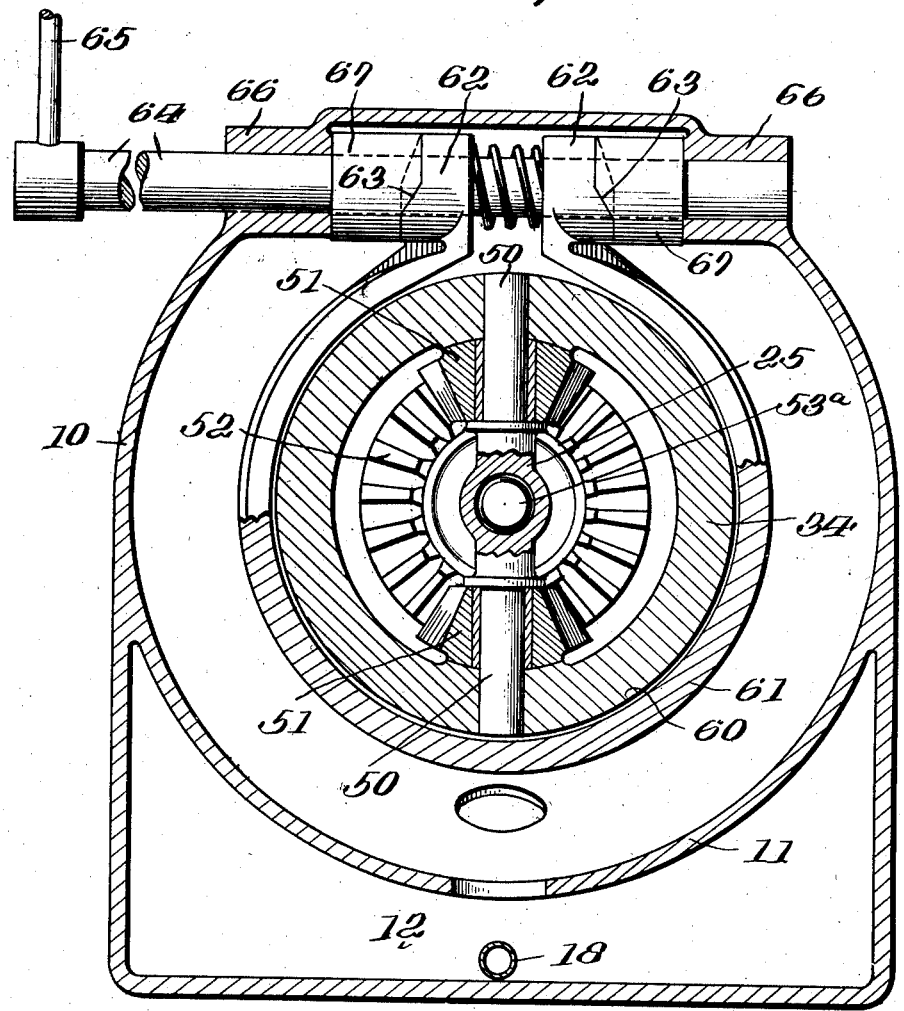

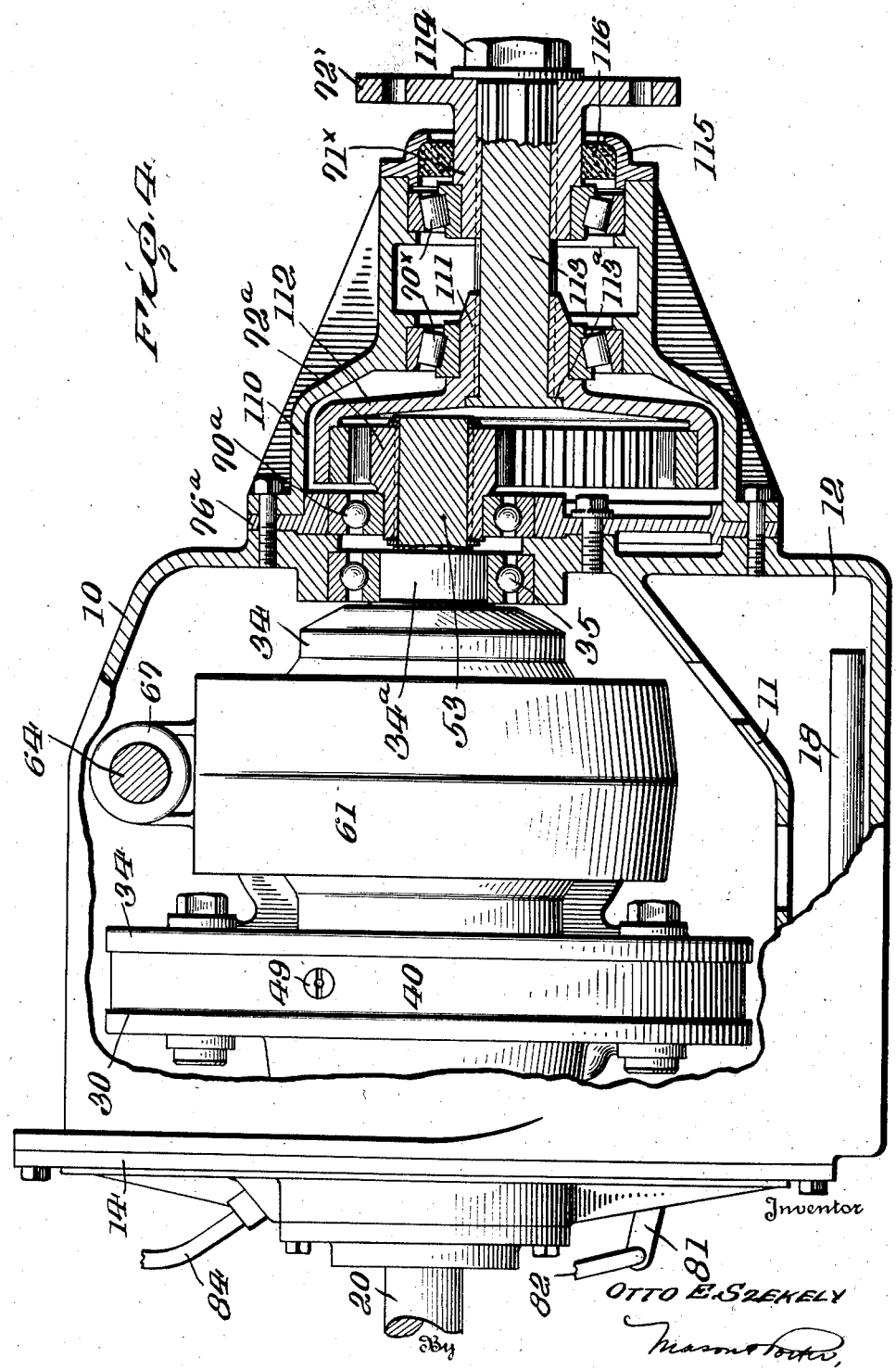

2,198,397

UNITED STATES PATENT OFFICE 2,198,397

VARIABLE SPEED TRANSMISSION

Otto E. Szekely, Elmira, N. Y., assignor to The Szekely Company, Inc., a corporation of New York Application March 19, 1937, Serial No. 131,919

9 Claims. (Cl. 74—293)

The present invention relates to improvements in mechanism for transferring power from a prime mover to a load, and including means for reversing the direction of actuation of the load.

One of the features of the present invention is the provision of such a mechanism for obtaining forward and backward movement of a load, and including means for controlling the torque and speed effects delivered at the load, as well as the direction of actuation thereof.

Another feature of the present invention is an assemblage of parts by which a reverse gear comprises parts which are selectively controlled for producing coupling between the structures connected to the prime mover and structures which are actuated under idling conditions at a speed determined by the difference of the speeds of the prime mover and of the load; and which under other conditions comprises a connection between the differentially actuatable member and a fixed frame for producing a movement of the load in the opposite direction.

A further feature of the present invention is an assemblage of parts which is specifically advantageous for the coupling of a marine engine to a propeller, and comprises a differentiating gearing having two sun gears and a planet pinion, with means for immobilizing the axis of the planet pinion with respect to a fixed frame, or for controlling the rate of movement of such axis with respect to the movement of one of the sun gears, said one sun gear being connected to the prime mover and the other sun gear being connected for driving the load.

With these and other features in view as objects of the invention, as will appear in the course of the following description and claims and as set out in the drawings, an illustrative form of construction is disclosed by these drawings, in which:

Fig. 1 is an upright longitudinal sectional view through a transmission.

Fig. 2 is a transverse upright sectional view substantially on line 2—2 of Fig. 1.

Fig. 3 is a similar sectional view substantially on line 3—3 of Fig. 1.

Fig. 4 is a view corresponding to Fig. 1, but with certain parts thereof in elevation, and showing the employment of a reduction gear in the driven portion of the transmission.

In these drawings, a fixed frame is provided by outer housing structures including a central member 10 having an apertured partition 11 extending in a generally horizontal direction beneath the rotating parts for dividing the mechanism space from a sump space 12. This central portion is illustrated also as having an annular portion 13 to provide bearings for the driven or tail shaft portions as will be described hereinafter. The open front or driving end of this central structure 10 is closed by a member including the flange 14 which is bolted or otherwise secured to the central member 10, and has an inwardly extending annular structure 15, an annular channel 16 in this structure, a duct or passage 17 leading from the annular channel 16, and is further provided with a tube 18 establishing an inlet connection to the passage 17 and leading to a desired point of the sump 12. In marine engine work, for example, it is not unusual for the engine crank shaft and propeller shaft to incline relatively downward from the engine to the propeller, and hence, in the illustrated form, the open end of the tube 18 is near the rear end of the sump 12.

A prime mover (not shown) of any appropriate nature is connected to the driving shaft 20 which is supported by bronze bearing sleeves 21, and extends through the inner pump gear 22 and the bevel gear 23, being splined or otherwise secured to these gears 22 and 23. A stub end 20a of the driving shaft 20 is received by a roller bearing 24 in a central hub 25 of a differential spider, as will be more closely described hereinafter.

A revoluble differential cage is constituted by a front end member 30 which receives the bronze sleeves 21 and is supported from the housing member 14 by anti-friction bearings 31. This member has an annular channel 32 in alignment with the channel 16, and from this channel 32 the ports 33 lead to the pump gears for delivering liquid thereto. A second member 34 has a flange located parallel to the member 30 to provide space for the pump gears, and also includes a structure extending around differentiating gearing members including the aforesaid sun gear 23, and including a sleeve portion 34a which is supported by anti-friction bearings 35 relative to the annular portion 13 of the housing structure 10. To assure freedom of movement of the parts, the sun gear 23 is mounted for rotation relative to the differential casing structure 34 by anti-friction bearings 36.

The space between the parallel faces of the members 30 and 34 is occupied (Fig. 2) by a filler structure and pump housing 40 which has cavities for the reception of the inner pump gear 22 and mating pump gear means, illustrated as the two pump pinions 41. In the illustrated form, the pinions 41 are carried by bearings for rotation about fixed bolts 42 which pass through the members 30, 34 and maintain the parts against separation under the liquid pressures which may be developed during the operation of the system.

The assembly of structures 30, 40, 34 thus rotates together. The channels 16, 32 are constantly in open communication with one another, and are sealed against the escape of liquid therefrom, or the pentration of air thereto, by the packings 45, 46.

The central spider portion 25 is formed with the pins 50 which extend radially away from the axis of the driving shaft 20 and receive the differential pinions 51 which, on the one hand, are in mesh with the driving sun gear 23, and, on the other hand, are in mesh with the sun gear 52 which is splined to the driven or tail shaft 53. The tail shaft 53 has a stub end 53a which is supported by a bearing 24 within the spider 25, so that the spider 25 assists in maintaining the shafts 20 and 53 in accurate coaxial relationship. The sun gear 52 is supported in the differential casing by the anti-friction bearings 55.

The outer surface of the differential casing member 34 is provided with a cylindrical surface 60 upon which may be pressed a brake band 61 which is illustrated (Fig. 3) as having the outwardly directed ears 62 with the beveled surfaces 63 thereon. These ears 62 are apertured to receive an actuating shaft 64 which has means such as the crank 65 for rocking the same. This shaft 64 is supported by bearing members 66 in the housing member 10. Within the housing, the shaft 64 has fixed thereto the actuator collars 67 which have beveled surfaces cooperative with the surfaces 63. When the parts are in the position shown in Fig. 3, the beveled surfaces permit the greatest separation of the two ears 62, and hence the brake band is held free of the cylindrical surface 60 by the resiliency of its structure. When the crank 65 is moved, the beveled surfaces 63 cooperate to force the ears 62 closer together and thus to apply the brake band 61 upon the cylindrical surface 60 and thus bring the differential case to a standstill relative to the frame.

In the form shown in Fig. 1, the tail shaft 53 is provided with a heavy anti-friction bearing 70 close to the end of the housing structure, this bearing being constructed and arranged to support both radial loads and end thrusts. The shaft 53 has a collar 53b for engagement with one end surface of the axle race of the bearing 70, and the other end surface thereof is engaged by the end of a sleeve 71 of a driving flange structure 72, this structure being splined to the end of the tail shaft 53 and being held in position by the washer 73 and nut 74 which engages on the outer threaded end of the shaft 53. Loads on the anti-friction bearing 70 are transferred to the transmission by the engagement of the outer race of the bearing 70 with a shoulder 75 at one end, and by engagement with the clamping ring 76 at the other end thereof.

For the purpose of determining and controlling the flow of fluid in the pump, and the pressures to be developed thereby, the pump housing 40 is shown (Fig. 2) as having the discharge ports 40a by which the fluid flows from the pumps back into the space of the general housing and thus to the sump 12. These passages 40a receive calibrated plugs 49 which restrict the flow of the fluid; and hence, when the passages and pump are full of oil, the retardation on the movement of the oil sets up a back pressure at the pump which is sufficient substantially to block the same against relative movement of the gears 22, 41.

For the control of the fluid in the pump, the passage 17 is provided with a rotatable closing member 80 constituting an oil supply valve, and having an actuatable arm 81 which may be moved by the link 82 to close off the oil flow more or less. Further, the channel 16, 32 communicates by an air passage 83 with a conduit 84 which leads to a closing valve or cock 85. During the operation, the volume of flow of oil can be controlled by movement of the valve 80, so that when the valve 80 is fully open, a maximum back pressure effect occurs by reason of the plugs 49: and when the valve 80 is fully closed, no further oil has access from the sump 12 to the channel 16, 32 and thus into the pump. However, the pump is unable to expel all of this oil and hence a partial back pressure or dragging action still occurs therein. It is also possible to regulate the rate of oil flow by a partial breaking of the vacuum created in the channel 16, 32 by pump action, through a slight opening of the air valve 85. Furthermore, when the control rate is determined, as is preferred, by the oil valve 80 (due to the greater sensitivity), it is possible to shift the system quickly from a condition of full drive and maximum torque, to the idling position in which the pump parts have substantially no dragging effect, by quickly opening the air valve 85 so that on the one hand the suction of oil from the crank case 12 is stopped, and on the other hand, the entering air serves to scavenge and clear the pump of oil.

The operation of this structure is as follows:

When the device is used for driving a boat, and the prime mover and boat are at a standstill, all parts of the mechanism are likewise to be assumed without motion relative to the housing 10, 14. The sump 12 contains a quantity of liquid, such as a low-freezing oil, and the outlet valve 80 is closed so that the pump parts can turn freely, and the brake band 61 is free of the surface 60.

The prime mover can now be started in an appropriate way, so that the shaft 20 is driven. If it be assumed that the shaft 20 is being turned at a speed of 1000 R. P. M., then the inner pump gear 22 and the sun gear 23 are also being turned at this same rate. Since there is no back pressure at the pump and no retardation by brake band 61 upon the differential case 34, the inner pump gear 22 merely spins the pump pinions 41. The bevel sun gear 23 turns the differential pinions 51 about their pins 50. Since the tail shaft 53 is at a standstill, the pinions 51 roll along the sun gear 52 and thus carry their axis pins 50 and thus rotate the differential case 34 and the pump housing structure 40. The rotation is governed by the ratio of the parts, and in the illustrated example, the differential case 34 will be turned in the same direction as the driving shaft 20 but at a speed of 500 R. P. M. Thus, the inner pump gear 22 is turning at 1000 R. P. M., while the pump housing is turning in the same direction but at a speed of 500 R. P. M.

To obtain forward motion of the vessel, the oil valve 80 is moved toward open position. The oil is drawn in from the tube 18 into the pump and then discharged therefrom with retardation by the plugs 49, is now placed under pressure and a back pressure is established in the pump which appears as a force acting upon the pump housing and upon the differential case to accelerate it in the direction of rotation of the driving shaft 20. This is accompanied by a pressure at the pins 50 upon the pinions 51 which seeks to cause the pinions to move faster bodily about the axis of the drive shaft 20. Since the speed of rotation of the sun gear 23 is fixed by the prime mover speed, this pressure operates to cause a rotation of the sun gear 52 and therewith of the tail shaft 53, so that the tail shaft is now brought into motion at a speed determined by the back pressure created by the valve 80, and by the load demand upon the tail shaft 53. Thus, for a given and constant load on the tail shaft 53, the successively greater obstruction and pressures created in gradually opening the valve 80 causes the tail shaft to turn faster and faster. In the particular example, for each increment of 100 R. P. M. of the differential case, the tail shaft 53 is given an increment of rotational speed of 200 R. P. M. Thus, when the valve 80 is fully opened and a hydraulic block exists at the pump, the pump housing 40 is turning at the same speed as the inner pump gear 22, that is, it is turning at the speed of the driving shaft 20. At this time, also, the pins 50 with the pinions 51 are being carried bodily around the common axis of shafts 20, 53, at this same speed: and the gear 52 is likewise being driven at this speed. Hence, the ratio of drive is 1:1 or direct, between the shafts 20 and 53. It will be noted that this ratio can not be exceeded, as the blocking action involves a matter of back pressure created by the pump itself, and that the parts of the pump cannot overrun one another in this particular form of structure, by reason of power being introduced from the driving shaft 20.

If the load demand on the tail shaft 53 should increase, then the torque demand at the tail shaft 53 and sun gear 52 increases in similar ratio, and this increase will result in a rotation of pinions 51 about their pins 50. The rotation of the pinions 51 about their axes is accompanied by a relative movement of the differential case 34 and the pump housing 40 with respect to the driving shaft 20 and the inner pump gear 22, since the back pressure effect formerly existing is no longer sufficient to maintain the parts at the particular relative speeds of the driving shaft 20 and driven shaft 53 which has been existing. Hence, the tail shaft 53 passes to a lower speed.

It is obvious that either in direct drive or at the intermediate speeds determined by the hydraulic control constituted by the pump and valve, any change in the speed and/or torque delivered to the driving shaft 20 will be accompanied by changes in the speed and/or torque at the load. Thus, for a given and constant engine speed, at a torque which is precisely satisfying the load demand for torque at a low relative speed of the load, an increase of the torque output at this constant speed of the prime mover will occasion an increase in the speed of the tail shaft and thus of the load until the product of speed and torque at the load is again commensurate with the product of speed and torque at the driving shaft.

If it is desired to operate the tail shaft in a reverse direction, from the aforesaid idling position, the crank 65 is actuated to apply the brake band to the cylindrical surface 60. This results in immobilizing the pins 50, so that the sun gear 23 is no longer able to cause the pinions 51 to travel bodily with the pins 50 around the axis of the shafts 20, 53. Hence, the pinions 51 now operate as simple reversing idlers and produce a rotation of the sun gear 52 in an angular direction opposite to that of the sun gear 23 and at the same speed and substantially the same torque, so that the load is now driven in the opposite direction.

The particular construction lends itself also to the employment of a reduction gear for instances in which the speed of the prime mover is greater than that required at the load. In marine work, for example, an excessive speed of a propeller 100, connected to the tail shaft 53, would result in cavitation and loss of efficiency during the accelerating and decelerating periods of the vessel.

From Fig. 4, it will be noted that the end ring 76 may be replaced by a ring 76a for supporting an anti-friction bearing 70a which is intended primarily for resisting any tendency of whipping at the tail shaft 53. This tail shaft 53 is splined to a gear 72a of small diameter, which is supported against distortion by radial loads thereon, by the aforesaid anti-friction bearing 70a.

A rear housing section 110 is connected to the central housing section 10, with the intermediate ring structure 76a clamped therebetween. This rear housing structure 110 supports the roller bearings 70x and holds them against permitting endwise or axial movement in the final driven shaft, substantially as described for the strong anti-friction bearing 70 in the form of Fig. 1. Since the reduction of speed represents also an increase in torque and hence of probable thrust effects, it is desirable in this form to provide amply strong bearings 70x.

These bearings 70x support the sleeve 71x of the coupling flange 72x which is connected for driving the propeller, in this specific example, and also support the sleeve 111 of an internally cut gear 112 which is in mesh with the small gear 72a. Differences in the diameters of the gears 72a, 112 are provided for by the eccentric mountings of their respective shafts 53, 113. The structures 76a, 110, provide an oil sump, which may be separate from the general oil sump 12, and receives a supply of lubricant which is being constantly lifted by the gear 112 in its movement and thus delivered to the various bearing surfaces.

The final driven shaft 113 is illustrated as splined to the sleeves 71x, 111, and as having a collar 113a at its inner end and operating at its threaded outer end with a nut 114 to assure proper transfer of thrust effects to the bearings. The rear end of the housing 110 is closed by a ring 115 having an oil seal 116 therein.

It is obvious that the invention is not limited solely to the construction shown, but that it may be employed in many ways within the scope of the appended claims.

I claim:

1. A reverse and control gear mechanism comprising a housing, a driving shaft, a driven shaft; a differentiating gearing including a differential case, a bevel sun gear driven by the driving shaft, a bevel sun gear connected to the driven shaft, and bevel planet pinion means journalled on the case for rotation about the axes of the sun gears; a gear pump including a part connected to the driving shaft and a part connected to the differential case, said parts comprising an inner gear, a pump pinion meshing therewith, and a pump housing having thereon an axis for said pump pinion, said gear pump being effective upon relative movement to displace fluid, a sump for liquid and a conduit from said sump to said gear pump, at least a part of said conduit being stationary with the housing, and means for controlling the pressure of fluid at said parts and effective through such pressure for causing said differential case to rotate in the direction of the driving shaft, said fluid-controlling means including a valve on said stationary part of the conduit; and means connected to the housing for holding the differential case against rotation.

2. A variable speed transmission comprising a sump for liquid, a driving shaft, a driven shaft; a differentiating gearing having bevel sun gears connected to said shafts, and bevel planet pinion means; a gear pump having an inner gear connected to the driving shaft and a pump housing with pump pinions journaled therein, said housing being connected to said planet pinion means, a supply duct through which said pump sucks liquid from the sump, means for retarding the escape of liquid from the pump, a valve for selectively obstructing said duct, and an air valve for admitting air to said duct between said valve and pump to break the suction.

3. A reverse and control gear mechanism comprising a main housing, a driving shaft, a driven shaft, said shafts being coaxial, a revoluble structure concentric with said shafts, anti-friction bearings between said case and shafts, bevel sun gears connected to said shafts and located inside said revoluble structure, bevel planet pinion means journalled in said revoluble structure in mesh with the sun gears, brake means for immobilizing the revoluble structure relative to the frame; a gear pump including a pump gear connected to said driving shaft, a pump housing forming part of said revoluble structure, and a pump pinion journalled in said housing; means for supplying liquid to said gear pump including a duct having a part stationary with the housing, a valve on said stationary part of the duct, and means for controlling the liquid pressure prevailing at said pump gear and pump pinion.

4. A variable speed transmission comprising a main housing, a driving shaft, a coaxial driven shaft; a member revoluble about the common axis of said shafts, an end flange, and pivot pin means extending substantially radially from the said common axis; a pair of bevel sun gears located inside said member, and bevel planet pinion means journalled on the pivot pin means and in mesh with the sun gears, one said sun gear being connected to the driving shaft and the other said sun gear being connected to the driven shaft; a second member revoluble about the common axis and having an end flange, a pump housing between said flanges, means for clamping the flanges and housing together so that the members revolve as one, an inner pump gear fixed on said driving shaft and located in said pump housing, a pump pinion journalled in the housing in mesh with said pump gear, said pump housing including a discharge outlet from the said pump gears, means in the outlet for restricting the flow of liquid therethrough; said second member having a suction duct through which liquid is sucked by the pump gears when the driving shaft and housing are turning at different rates, said main housing having a duct communicating with said suction duct, and a valve for limiting the flow of liquid through said ducts.

5. A transmission as in claim 4, and including a valved air inlet passage communicating with the ducts between said valve and the pump gears.

6. A variable speed transmission comprising a main housing, a driving shaft, a coaxial driven shaft; a member revoluble about the common axis of said shafts and having an external braking surface, an end flange, pivot pin means extending substantially radially from the said common axis, and a brake band for engaging said braking surface and holding the member against rotation; a pair of bevel sun gears located inside said member, and bevel planet pinion means journalled on the pivot pin means and in mesh with the sun gears, one said sun gear being connected to the driving shaft and the other said sun gear being connected to the driven shaft; a second member revoluble about the common axis and having an end flange, a pump housing between said flanges, means for clamping the flanges and housing together so that the members revolve as one, an inner pump gear fixed on said driving shaft and located in said pump housing, a pump pinion journalled in the housing in mesh with said pump gear, said pump housing including a discharge outlet from the said pump gears, means in the outlet for restricting the flow of liquid therethrough; said second member having a suction duct through which liquid is sucked by the pump gears when the driving shaft and housing are turning at different rates, said main housing having a duct communicating with said suction duct, and a valve for limiting the flow of liquid through said ducts.

7. A reverse and control gear mechanism comprising a housing, a driving shaft, a driven shaft; a differentiating gearing including a differential case, a bevel sun gear driven by the driving shaft, a bevel sun gear connected to the driven shaft, and bevel planet pinion means journalled on the case for rotation about the axes of the sun gears; a gear pump including a part connected to the driving shaft and a part connected to the differential case, said parts comprising an inner gear, a pump pinion meshing therewith, and a pump housing having thereon an axis for said pump pinion, said gear pump being effective upon relative movement to displace fluid, a sump for liquid and a conduit from said sump to said gear pump, at least a part of said conduit being stationary with the housing, and means for controlling the pressure of fluid at said parts and effective through such pressure for causing said differential case to rotate in the direction of the driving shaft, said fluid-controlling means including a valve on said stationary part of the conduit and also including a valve air bleeder opening into said duct to permit air to be drawn into said gear pump; and means connected to the housing for holding the differential case against rotation.

8. A variable speed transmission comprising a housing including a sump for liquid, a driving shaft, a driven shaft; a differentiating gearing having bevel sun gears connected to said shafts, and bevel planet pinion means; a gear pump having an inner gear connected to the driving shaft and a pump housing with pump pinions journaled therein, said housing being connected to said planet pinion means, a supply duct through which said pump sucks liquid from the sump, at least a part of the supply duct being stationary with the housing, means for retarding the escape of liquid from the pump, a valve on the housing for selectively obstructing said stationary part of the duct, and an air valve stationary with the housing for admitting air to said duct between said valve and pump to break the suction.

9. A variable speed transmission comprising a main housing, a driving shaft, a coaxial driven shaft; a member revoluble about the common axis of said shafts, an end flange, and pivot pin means extending substantially radially from the said common axis; a pair of bevel sun gears located inside said member, and bevel planet pinion means journalled on the pivot pin means and in mesh with the sun gears, one said sun gear being connected to the driving shaft and the other said sun gear being connected to the driven shaft; a second member revoluble about the common axis and having an end flange, a pump housing between said flanges, means for clamping the flanges and housing together so that the members revolve as one, an inner pump gear fixed on said driving shaft and located in said pump housing, a pump pinion journalled in the housing in mesh with said pump gear, said pump housing including a discharge outlet from the said pump gears, means in the outlet for restricting the flow of liquid therethrough; said second member having a suction duct through which liquid is sucked by the pump gears when the driving shaft and housing are turning at different rates, said main housing having a duct communicating with said suction duct, a valve for limiting the flow of liquid around the pump gears through said suction duct, and an air bleeder valve for admitting air into said suction duct between said first valve and the pump gears.

OTTO E. SZEKELY.